United States Patent [19]

Carlsson et al.

[11] Patent Number: 5,744,005
[45] Date of Patent: Apr. 28, 1998

[54] SELF-SUPPORTING STRAINING DEVICE FOR A CONTINUOUS DIGESTER

[75] Inventors: Jan G. Carlsson; Sören Söderquist, both of Karlstad, Sweden

[73] Assignee: Kvaerner Pulping Technologies Aktiebolag, Sweden

[21] Appl. No.: 501,070

[22] PCT Filed: Jan. 14, 1994

[86] PCT No.: PCT/SE94/00020

§ 371 Date: Aug. 14, 1995

§ 102(e) Date: Aug. 14, 1995

[87] PCT Pub. No.: WO94/19533

PCT Pub. Date: Sep. 1, 1994

[30] Foreign Application Priority Data

Feb. 16, 1993 [SE] Sweden ........................ 93300504

[51] Int. Cl.$^6$ .................................................. D21C 7/14
[52] U.S. Cl. ........................................................ 162/251
[58] Field of Search ........................... 162/251; 210/357, 210/391, 392, 413, 162

[56] References Cited

U.S. PATENT DOCUMENTS

| 828,715 | 8/1906 | Cook. | |
| 2,998,064 | 8/1961 | Lang | 162/251 |
| 3,752,319 | 8/1973 | Richter | 210/357 |
| 4,826,589 | 5/1989 | Hirs | 210/159 |
| 5,470,437 | 11/1995 | Oulie et al. | 162/237 |

OTHER PUBLICATIONS

Drawing 1-2212-340 RI by Kamyr Inc., Glenn Falls, NY.
Deutschman et al., Machine Design-Theory and Practice, Fig. 3-44.
Design Guidelines for the Selection and Use of Stainless Steel, Table 10.

Primary Examiner—Donald E. Czaja
Assistant Examiner—Dean T. Nguyen
Attorney, Agent, or Firm—Ronald P. Kananen

[57] ABSTRACT

The present invention relates to a straining device in association with the displacement of liquid through a pulp bed preferably in connection with the withdrawal of cooking liquid in a continuous digester (1) for producing chemical pulp, which straining device (2) is preferably rectangular and comprises a number of strainer-bars (3), arranged in parallel, which have been fixed to at least two rod elements (4, 5), which are placed transversely in relation to the lengthwise extension of the bar-strainers, the said rod elements (4, 5) being made of metal, preferably stainless steel, and having a strength value RP 0.2 at 100° C. which exceeds 200 MPA, preferably 300 MPA, and more preferably 350 MPA, and the width of the said rod element (4) being less than 800 mm, preferably 650 mm, and more preferably 550 mm, so that the straining device becomes self-supporting.

8 Claims, 6 Drawing Sheets

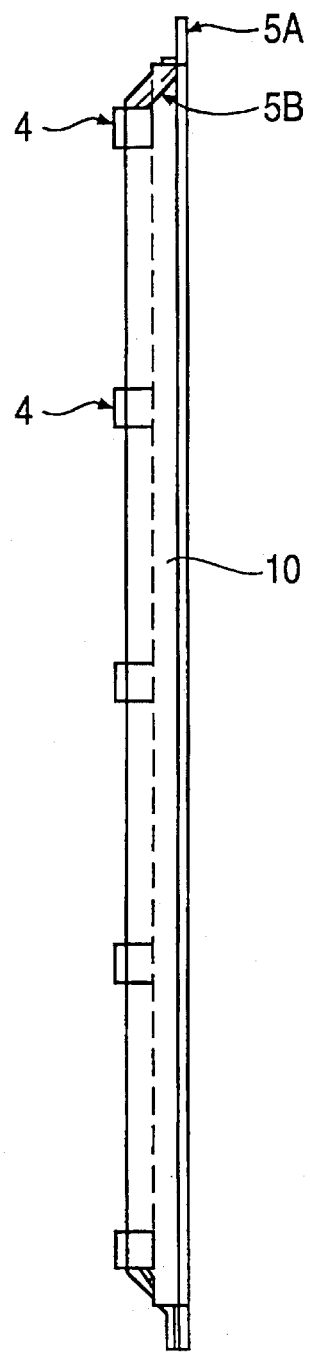

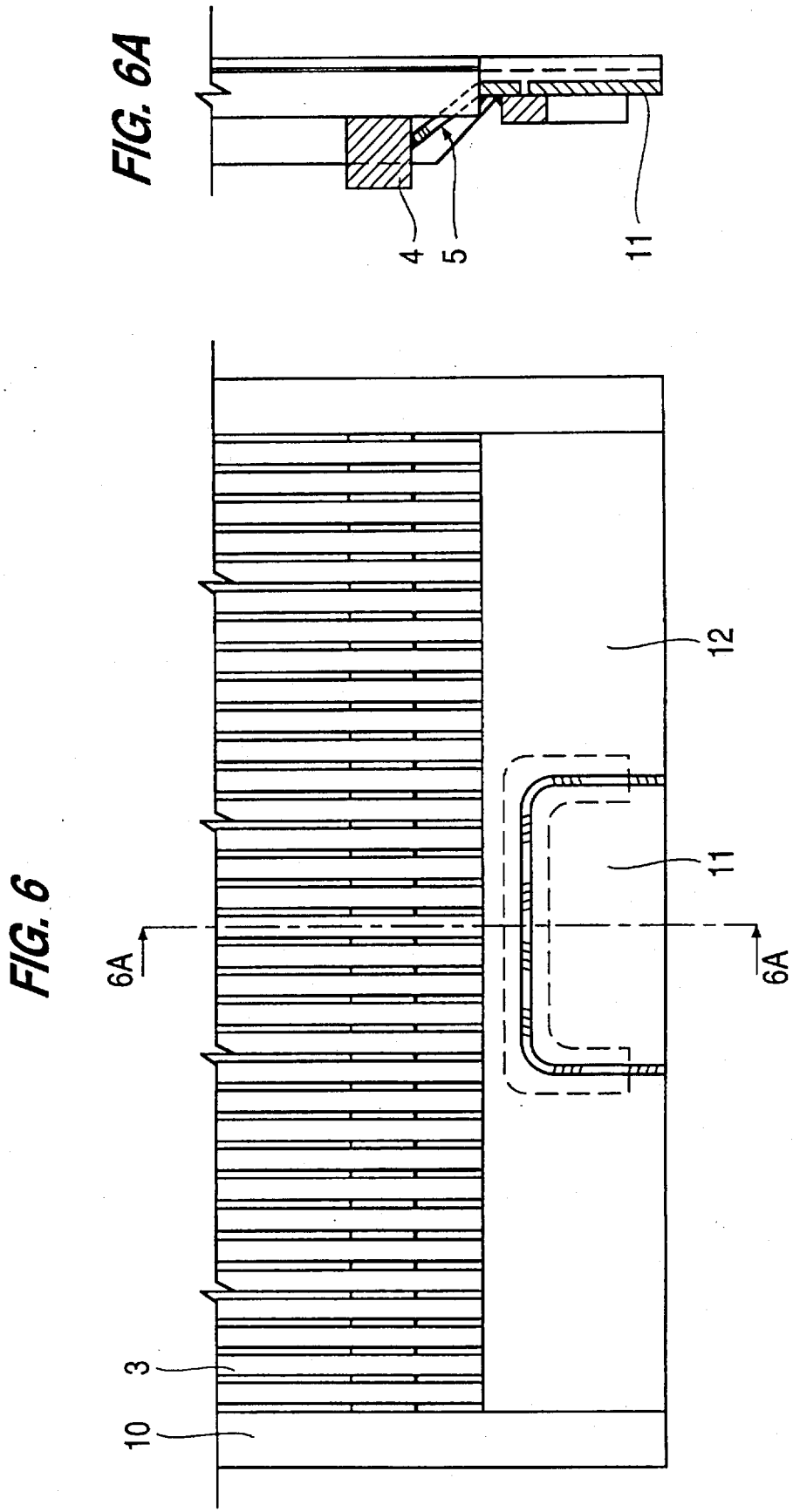

SELF-SUPPORTING STRAINING DEVICE FOR A CONTINUOUS DIGESTER

TECHNICAL FIELD

The present invention relates to a straining device in association with the displacement of liquid through a pulp bed, preferably in connection with the withdrawal of cooking liquid in a continuous digester for producing chemical pulp.

STATE OF THE ART AND PROBLEMS

In connection with producing chemical pulp, environmental considerations have become increasingly important. In particular with regard to the bleaching of chemically produced pulp, the trend is for rapid movement towards the use of methods which are ever more environmentally friendly. Many of these so-called environmentally friendly methods require that the strength properties of the pulp are very good on entry into the bleaching process. Thus, ever greater demands are made that the digester house process should, as far as possible, spare the fibres contained within the pulp. The possibility of providing a mild digester house process is improved by the digester being fitted with efficient straining devices, thereby permitting efficient displacement of liquid through the pulp bed inside the digester.

In particular in connection with using ever higher temperatures in the lower part of the digester (the so-called high-heat zone), it has been found to be important to have efficient strainer arrangements, something which is emphasised by the fact that, in principle, the whole digester is kept at a mainly constant temperature level, i.e. at so-called "isothermal cooking", with the temperature between the different cooking zones essentially lying preferably within an interval of four (4) degrees C. Consequently, there is a tendency for the number of strainer elements and/or the total strainer area in the lower part of the digester to increase in prospective digesters. This increase has involved the focus of attention being directed towards the arrangement of individual strainer elements, not least with regard to optimisation of fitting and of maintenance costs.

Nowadays, bar-straining devices are usually employed which comprise a number of strainer elements, often arranged in a cross-hatch pattern, with each strainer element comprising a number of vertical bars arranged in parallel, between which bars an opening is formed from which liquid can be withdrawn. A bar-strainer element which is commonly found nowadays is constructed (see FIG. 1) by the strainer bars (A), arranged in parallel, being welded into recesses in flat bars (B) which are placed transversely. In addition, at the back of these flat bars which are placed transversely there are welded on supporting pins (C) which are intended to bear against the inner wall (D) of the digester shell in order thereby to provide support for the strainer element.

Consequently, a known strainer element of this type is not self-supporting. It has been found that such strainer elements are very susceptible to incorrect installation, since the principle is based on bearing against the digester shell. If the strainer element is incorrectly installed, so that a gap arises between the wall of the digester and a/some supporting pin(s), this can lead to the whole strainer element collapsing. The reason for this is that the strainer element is very rigid and cannot therefore flex if an extreme loading should occur, with the consequent possibility of a "domino effect" of broken supporting pins, leading finally to the whole strainer collapsing. A collapsed strainer element is not only a loss per se, but also involves impaired pulp quality, while at the same time the risk is present that, in association with such a collapse, loose supporting pins can destroy equipment which is located downstream in the process.

In addition, known strainer elements are relatively difficult to clean since, normally, relatively intricate steps have first to be undertaken in order even to reach the rear surface of the strainer element for washing it. A further disadvantage of known strainer elements is that they have a relatively pronounced tendency to collect accretions, so-called scaling, both on the strainer bars and developing out from the supporting pins, leading to a decrease in the effective area and increasing the friction in the strainer elements such that, after a certain time, exceptional measures have to be carried out with a view to eliminating accretions.

SOLUTION AND ADVANTAGES

With the aid of the invention, it has been possible to eliminate the abovementioned problems, the invention comprising a strainer for the displacement of liquid through a pulp bed preferably in connection with the withdrawal of cooking liquid in a continuous digester 1 for producing chemical pulp, which straining device 2 is preferably rectangular and comprises a number of bars 3, arranged in parallel, which have been fixed to at least two rod elements 4 which are placed transversely in relation to the lengthwise extension of the bar-strainers which are made of metal, whereby the said rod elements 4 are made of metal with a very good strength, preferably stainless steel, and have a strength value RP 0.2 at 100° C. which exceeds 200 MPA, preferably 300 MPA, and more preferably 350 MPA, and the length of the said rod element 4 in a transversal direction in relation to the lengthwise extension of the bar-strainers, is less than 800 mm, preferably 650 mm, and more preferably 550 mm, and the cross-sectional area of the said rod elements 4 exceeds 500 $mm^2$ and that each end section of each rod element 4 is intended for interaction with a supporting element 7 so that the straining device becomes self-supporting.

A further advantage of a strainer element according to the invention is that it is easier to install than the previously used strainer element, while at the same time the element is easier to keep clean, due to its relatively modest width. In addition, the risk of blockage is decreased using a strainer element according to a preferred embodiment of the invention, since the number of surfaces placed transversely to the direction of movement of the pulp bed is further reduced.

A further advantage of a preferred embodiment of a straining device according to the invention is that, by eliminating supporting pins, the risk of scaling, which can block up the strainer, is diminished. Using a special surface treatment, so-called electropolishing, a surface is obtained which produces very low friction and which, moreover, possesses the advantage of having very little tendency to become coated, i.e. scaling can be further counteracted.

A great advantage of the novel strainer elements is that their width has been optimised with respect to maintenance, so that the strainer elements do not need to be lowered or lifted out of their position in order to be cleaned. That is to say, the small width means that it is possible, by using, for example, a high pressure nozzle through a correctly arranged clean-out door, manually to reach behind the strainer elements and clean them there, while, at the same time, cleaning of withdrawal holes, which may have become blocked, can be carried out.

BRIEF DESCRIPTION OF THE FIGURES

The invention will be described below against the background of the enclosed figures in which:

FIG. 5 shows a side view of a strainer element according to FIG. 4 and finally, FIG. 6 shows a special strainer element according to the invention which has been arranged with a clean-out door.

FIG. 1 shows a known method of arranging a strainer element in which the strainer element is not self-supporting. This strainer element comprises a number of strainer bars A which are fixed in parallel into a transverse stay B, in recessed grooves in this transverse stay. Supporting pins, which bear against the inner wall of the digester shell D, are arranged at regular intervals on the rear side of the transverse stay B.

FIG. 2 shows a preferred embodiment of a fragment of a digester 1 which has been arranged with a strainer element according to the invention. The strainer element 2 comprises a number of bars 3 which are arranged in parallel in relation to each other. These bars have a height (h) which considerably exceeds the width (b). Due to this design, they can flex laterally but are very flexurally rigid when the force is applied in the radial direction of the digester, i.e. the direction in which forces arise in connection with the withdrawal of liquid. In addition, the figure shows that each bar 3 has an inwardly (towards the centre of the digester) exposed surface 3A which is greater than the surface 3B exposed outwards.

Figure 1:
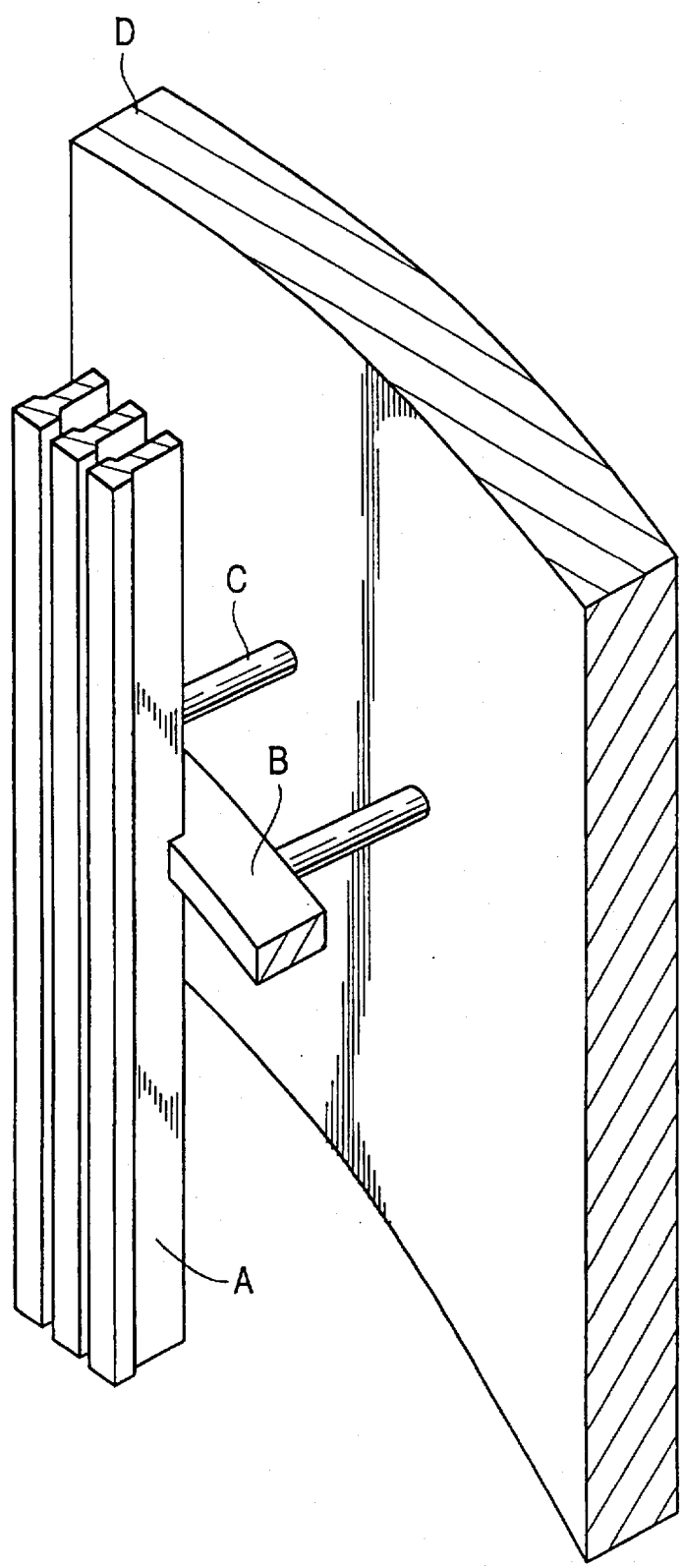
FIG. 1 shows essential parts of a previously known strainer element.
Figure 2:
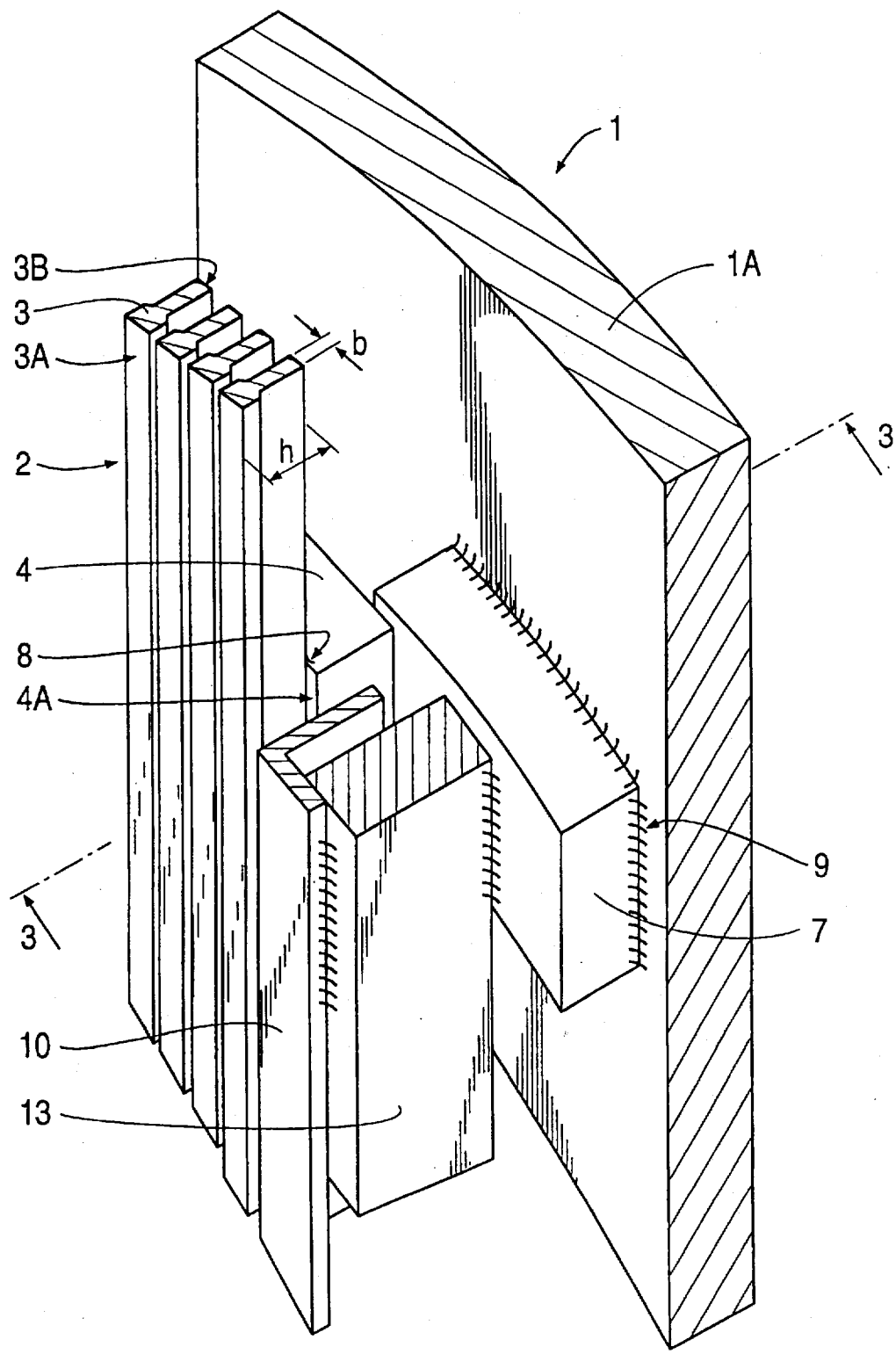
FIG. 2 shows essential parts of a preferred strainer element according to the invention, in perspective.

The bars 3 are welded to transverse rod elements 4. A fillet weld 8 is arranged flush with the rear surface of the bar 3 and an inwardly directed plane surface 4A of the said rod element 4. The rod element 4 is composed of a material with a very good strength, whereby, in the preferred case, it applies that the material consists of metal, preferably stainless steel, and has a strength value RP 0.2 at 100° C. which exceeds 200 MPA, preferably 300 MPA, and more preferably 350 MPA.

In addition, it applies that the rods in the preferred case have a cross-sectional area which exceeds 500 mm², preferably 700 mm², and that the flexural rigidity of a part of a straining device selected at will is equivalent to about 4500 mm³.

In addition, it applies that the said rods are arranged at a distance exceeding 200 mm from each other, preferably at a distance of 230 mm±25 mm.

At each end of each bar element 4, the strainer element 2 bears, without being fixed, against a supporting boss 7 which is welded 9 to the digester shell 1A. A supporting bar 13, which extends in a vertical direction, is welded to the boss 7. The function of this supporting bar is to provide support for the vertically placed L-bars 10 which form the outer vertical delimitations of each strainer element 2. When, as in the case shown, two strainer elements 2 are to be installed directly alongside each other, the supporting bar 13 is welded firmly to the middle of the boss 7 so that both supporting bar 13 and boss 7 are used for installation and force absorption for each of the neighbouring strainer elements. In order to be able to weld the strainer elements 2 firmly in the vertical direction, it is necessary, in this connection, to leave a gap of about 8 mm between neighbouring strainer elements 2. In a corresponding manner, a supporting ring 14 forms, in a horizontal direction, a support, extending horizontally and continuously, for the rear part of a bent flat rod 5 which forms the lower, or upper, respectively, peripheral element of the strainer element 2.

Figure 3:
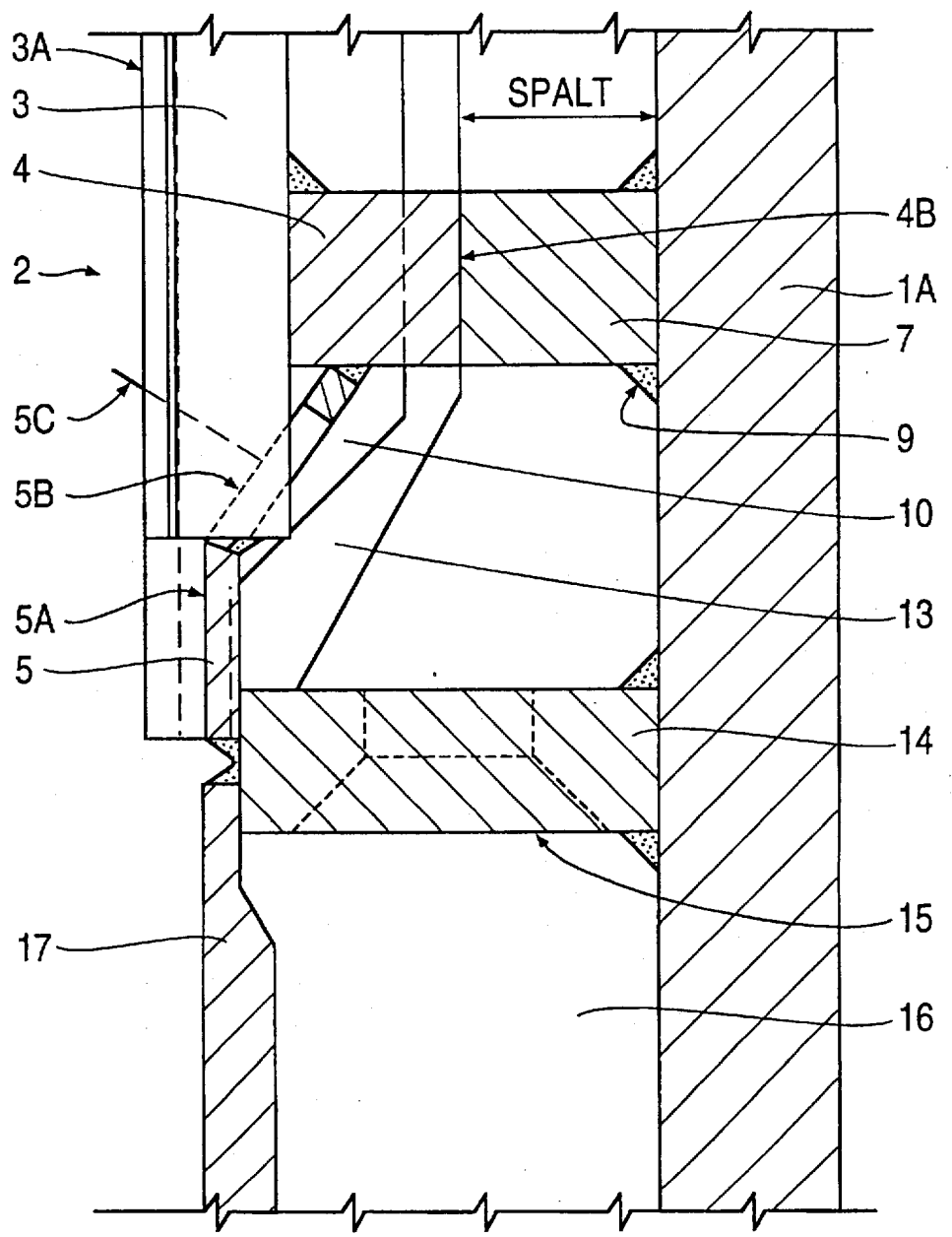
FIG. 3 shows the section A—A in FIG. 2.

FIG. 3 shows, in cross section, how each individual strainer element 2 is arranged in relation to the digester shell, seen from the side. As is evident from this figure, a relatively large gap is formed between the digester shell 1A and the rear surface 4B of each rod element 4 so that each strainer element 2 is provided with the possibility of flexing radially outwards. In addition, it is evident from FIG. 3 that each bar 3 is, by its end section, fixed into a flat rod 5 which has been bent in a particular manner.

The flat rod 5 has consequently been bent so that it has a first surface 5A which is vertically arranged and which at the top is situated on a level with the inwardly directed surface 3A of the bar-strainers, but at the bottom is situated somewhat further out towards the digester shell 1A. A second surface 5B is directed so that its normal plane forms an angle of approximately 45 degrees (±10°) with the essentially plane, inwardly exposed, surface of the strainer element. In addition, it is directed obliquely in towards the centre of the strainer element. At the lower end of the strainer element, the corresponding surface 5B is directed in a corresponding manner so that their normal planes (the 45 degrees alternate) meet approximately directly in front of the centre of the surface of the strainer element and there form an angle of 90 degrees, i.e. at the bottom it is directed obliquely upwards and at the top it is directed obliquely downwards.

The reason for these surfaces being arranged in such a way is that this entails an exceedingly favourable design for the pulp bed as it passes through this region with regard to the avoidance of blockage. The design eliminates projecting steps which can obstruct parts of the pulp web and lead to blockages. The background for there being a difference between the placement of the upper and lower flat rod 5 with regard to the vertically directed surface 5A, i.e. that the inwardly directed surface 5a at the bottom is placed somewhat below (radially outwards) the inwardly directed surface of the strainer element, is that an additional clearance is thereby obtained as the pulp passes through this point, which further promotes the passage of the pulp bed.

It is additionally evident from FIG. 3 that each strainer element has been fitted, at the vertically extending ends, with L-rods 10 whose one flange is directed radially (provides stiffening) and whose other flange has an inwardly directed surface which is situated on a level with the inwardly directed surface of the strainer element, the end section of the flange being welded onto the supporting bar 13 in connection with installation. It is consequently between the latter end sections that a gap is left to allow welding to take place.

In a corresponding manner, therefore, the outer end of the bent flat rod is welded by a fillet weld 18 onto the supporting ring 14. It should be noted that it is not a function of the latter weldings to absorb the loading which acts on the strainer element in a radial direction outwards, which force is intended to be absorbed by the rod elements 4 with the aid of their pivoting disposition against the supporting bosses 7. Withdrawal takes place through withdrawal holes 15 in the supporting ring 14 down to the header space 16, which is delimited inwards by a plate, and from there onwards through a connection piece in a known manner.

Figure 4:
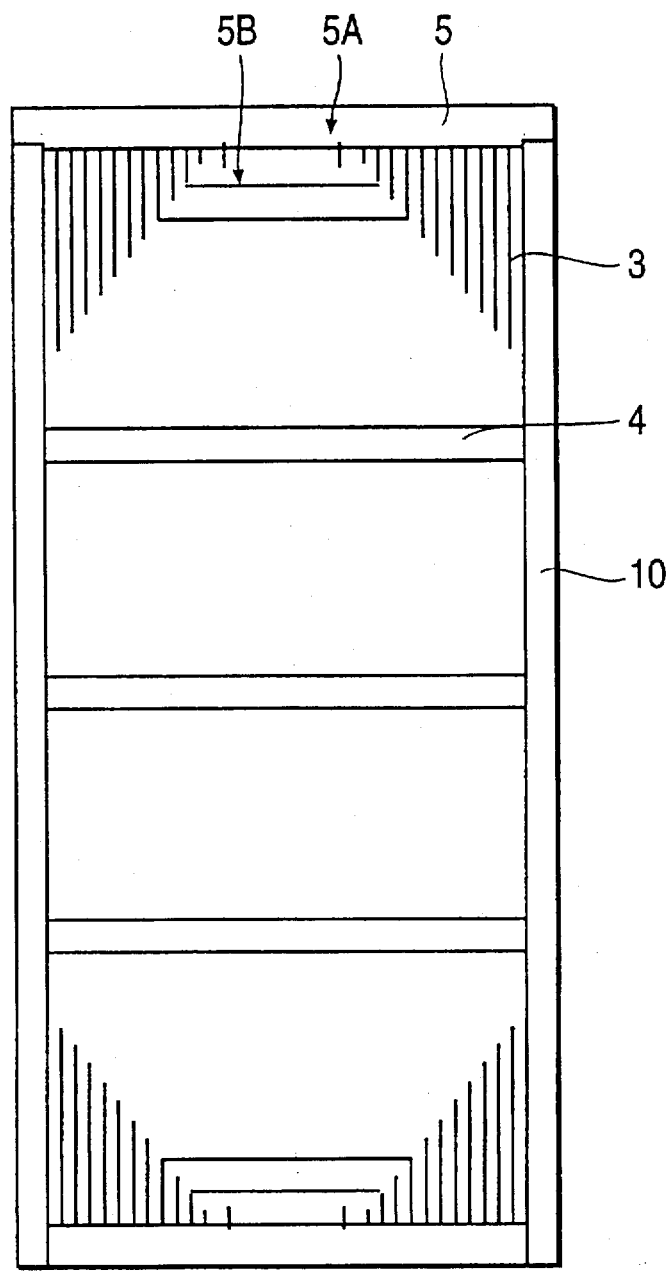
FIG. 4 shows a front view of a preferred strainer element.

FIGS. 4 and 5 show a front view and a side view, respectively, of a complete strainer element 2 according to a preferred embodiment of the invention. It is evident in this connection that the strainer element 2 has a height which considerably exceeds the width. With regard to the width, it applies in this connection that it is, in this preferred case, about 500 mm±50 mm. Furthermore, it applies that the width of the said rod element 4 is less than 800 mm, preferably 650 mm, and more preferably 550 mm. The reason for this, as has already been mentioned, is that this design simplifies installation and maintenance and makes it possible for the element to be "self-supporting".

FIG. 6 shows a special alternative of a strainer element according to the invention in which a clean-out door 11 has been fitted into the lower section of the strainer element. This clean-out door is arranged in a plate 12 which has been welded in between lower extensions of the L-bars 10 with a view, as has already been mentioned, to be able to wash and clean the strainer element from the rear, as well as to be able to reach withdrawal holes. This special arrangement with a clean-out door 11 located at the bottom of strainer elements is intended for strainer arrangements in which the strainer elements 2 are fitted alongside, in direct association with, each other.

Alternatively, the strainer elements are installed in a type of cross-hatch pattern in which every other position consists of a blank plate and every other position consists of a strainer element. In the case of this latter alternative, a separate clean-out door can thus be made in the blank plate area.

The invention is not limited by that which has been shown above, but can be varied within the scope of the subsequent patent claims. Thus, it will be evident to the person skilled in the art that the invention is not limited to the specific forms of strainer element which have been shown, or to its transverse stays and bar profiles. For example, the transverse stays can be made to be triangular in shape instead of rectangular, and the strainer elements made to be square or given another suitable configuration which can also deviate from the rectangular. In addition, it is evident that bolted joints, or the like, can be used instead of welding for installing the strainer elements. Furthermore, it is evident to the person skilled in the art that the supporting element can be welded onto the individual strainer element instead of being welded onto the digester shell. A disadvantage of the latter arrangement is that it is not then so easy to compensate for unevennesses in the digester shell. In the preferred case, the procedure is that the supporting rings 14 are first welded on, after which, appropriately with a ruler, it is checked that the distance from the inner surface of the supporting ring to the digester shell is essentially constant in a vertical direction. If a relatively large deviation should be encountered, this can be compensated by the supporting boss 7 either being lifted up somewhat in connection with welding, or by some other adjustment known to the person skilled in the art.

We claim:

1. A digester having a digester shell and comprising a strainer device; the strainer device comprising a number of strainer elements comprising:

a plurality of strainer bars made of metal, said strainer bars being arranged in parallel in a lengthwise direction; and at least two rod elements arranged transversely in relation to the lengthwise direction of said strainer bars, said strainer bars being fixedly attached to said rod elements;

wherein said rod elements are made of metal having a strength value RP 0.2 at 100° C. which exceeds 200 MPA, a length of said rod elements in a transversal direction in relation to the lengthwise extension of said strainer bars is less than 800 mm, each of said rod elements has a cross-sectional area that exceeds 700 $mm^2$, and an end section of each rod element is adapted for interaction with a supporting element arranged between the digester shell and each strainer element so that the strainer device becomes self-supporting.

2. A digester as claimed in claim 1, wherein said supporting elements are fixed to the digester shell.

3. A digester as claimed in claim 1, wherein said supporting elements are arranged at vertically extending sides of the strainer elements, and said supporting elements have a horizontal extension which is adapted to support two strainer elements installed alongside each other.

4. A digester as claimed in claim 1, further comprising a clean-out door arranged in close association with each strainer element.

5. A digester as claimed in claim 1, further comprising a clean-out door arranged in a plate installed at a bottom of each strainer element.

6. A strainer as claimed in claim 1, wherein each of said rod elements comprises at least one plane surface against which said strainer bars are arranged.

7. A strainer as claimed in claim 6; wherein said rod elements are secured to said strainer bars at a distance between adjacent rod elements exceeding 200 mm by means of fillet welding.

8. A strainer as claimed in claim 1, wherein said rod elements are electropolished.

* * * * *